(12) United States Patent
Kihara et al.

(10) Patent No.: US 8,732,235 B2
(45) Date of Patent: May 20, 2014

(54) RELAY SERVER, MOBILE TERMINAL, INFORMATION BROWSING SYSTEM AND METHOD THEREOF

(75) Inventors: Hideto Kihara, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 12/614,646

(22) Filed: Nov. 9, 2009

(65) Prior Publication Data

US 2010/0131593 A1 May 27, 2010

(30) Foreign Application Priority Data

Nov. 26, 2008 (JP) ................. 2008-300852

(51) Int. Cl.
*G06F 15/16* (2006.01)
*H04L 12/18* (2006.01)

(52) U.S. Cl.
CPC ........ *H04L 12/1895* (2013.01); *H04L 12/1859* (2013.01); *H04L 12/18* (2013.01)
USPC ............................ 709/203; 709/201; 709/202

(58) Field of Classification Search
CPC .. H04L 12/1895; H04L 12/1859; H04L 12/18
See application file for complete search history.

(56) References Cited

U.S. PATENT DOCUMENTS

| 6,182,122 | B1 * | 1/2001 | Berstis ................. 709/219 |
| 2002/0083145 | A1 * | 6/2002 | Perinpanathan ....... 709/219 |
| 2004/0012625 | A1 * | 1/2004 | Lei et al. ............. 345/738 |
| 2008/0005657 | A1 * | 1/2008 | Sneh ................. 715/501.1 |
| 2009/0138477 | A1 * | 5/2009 | Piira et al. ............ 707/10 |

FOREIGN PATENT DOCUMENTS

| JP | 11-238027 | 8/1999 |
| JP | 2001-51839 | 2/2001 |
| JP | 2002-24677 | 1/2002 |
| JP | 2002-149540 | 5/2002 |
| JP | 2003-44510 | 2/2003 |
| JP | 2005-251137 | 9/2005 |
| JP | 2005-316523 | 11/2005 |
| JP | 2008-199402 | 8/2008 |

OTHER PUBLICATIONS

"Hatena::Antenna," http://a.hatena.ne.jp, Access Date Jun. 23, 2008.
Japanese Office Action issued Sep. 4, 2012 in corresponding Japanese Patent Application No. 2008-300852.

* cited by examiner

*Primary Examiner* — Thomas Dailey
*Assistant Examiner* — Nam Tran
(74) *Attorney, Agent, or Firm* — Staas & Halsey LLP

(57) ABSTRACT

A computer implemented method including: periodically requesting an off-line data update processing based on automatic determination of a degree of importance of data and an update frequency; and updating the off-line data based on the requesting and displaying a page of on-line data resulting from the updating.

8 Claims, 24 Drawing Sheets

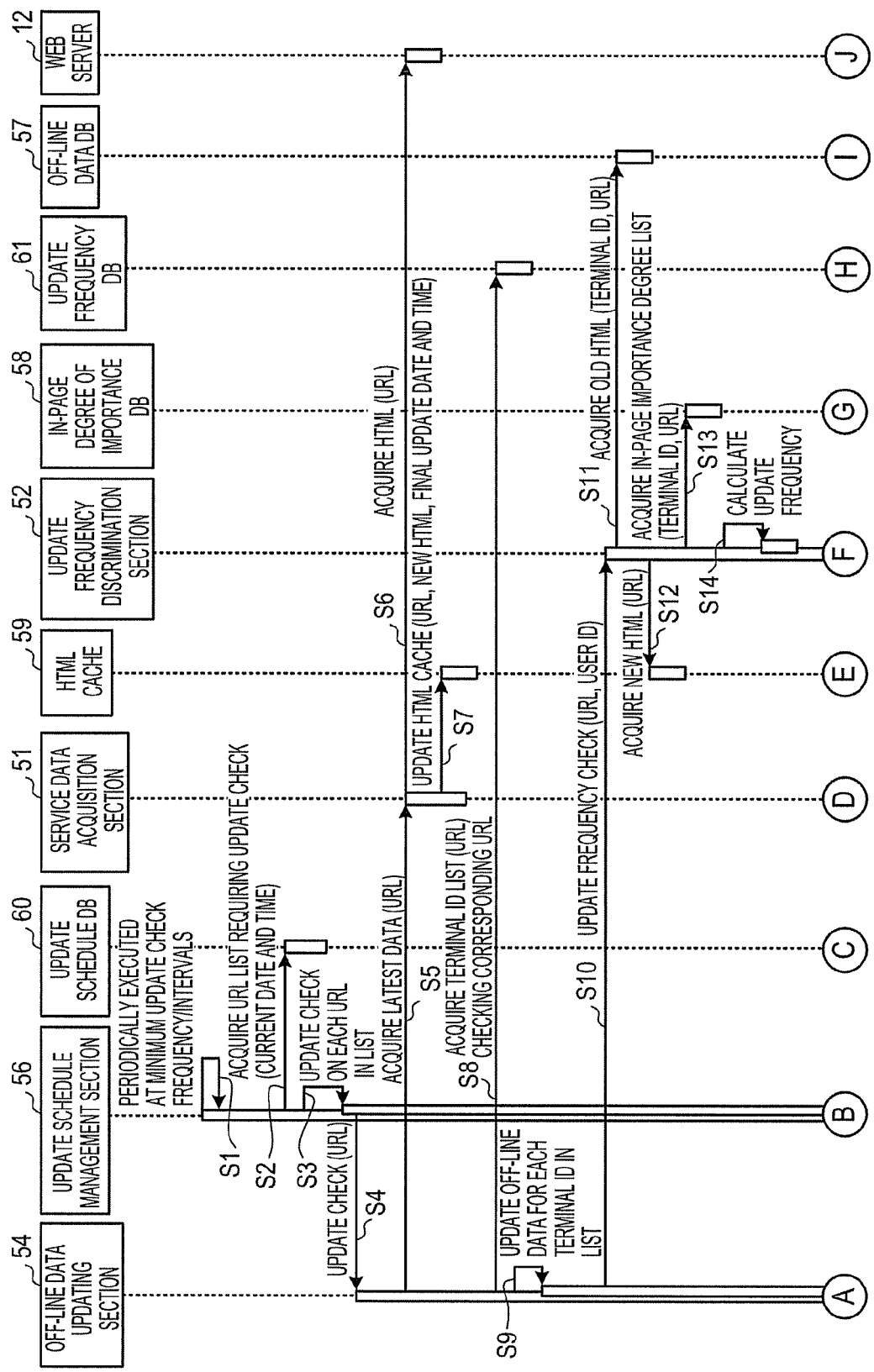

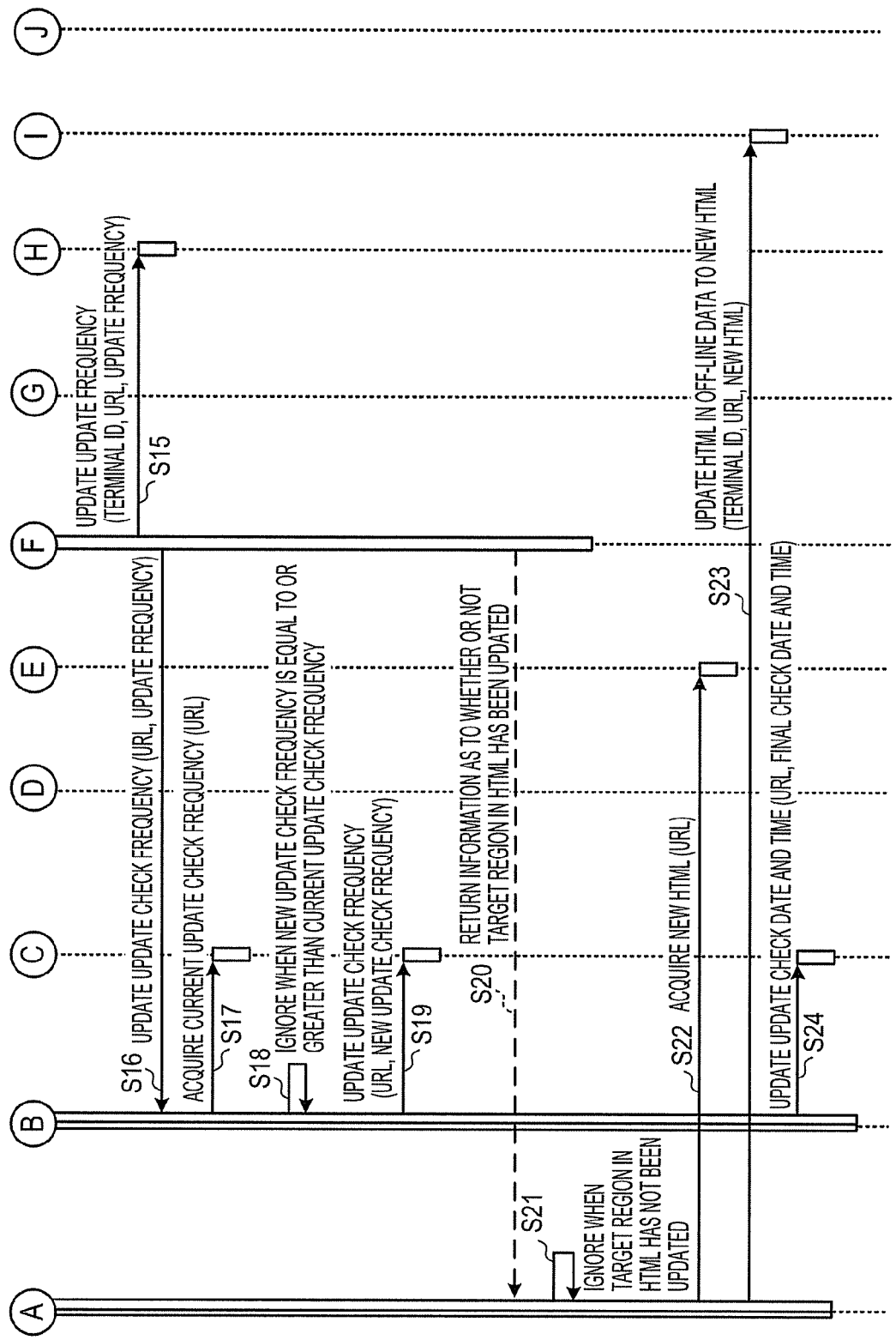

FIG. 6

| URL | UPDATE CHECK FREQUENCY | FINAL CHECK DATE AND TIME |
|---|---|---|
| http:// example.jp/ | 1 DAY | 2008 - 02 - 26T13:53:04 |
| http:// example.jp/news.cgi | 1 HOUR | 2008 - 02 - 26T14:21:56 |
| ... | | |

FIG. 7

| URL | FINAL UPDATE DATE AND TIME | BODY DATA |
|---|---|---|
| http:// example.jp | 2008-01-15T08:50:23 | <html><head><title> ○○ SERVICE </title> ... |
| http:// example.jp/news.cgi | 2008-02-26T11:45:30 | <html><head><title> NEWS </title> ... |
| ... | | |

FIG. 8

| TERMINAL ID | URL | UPDATE FREQUENCY (UPDATE INTERVAL) |
|---|---|---|
| 123456789ABCDEF | http:// example.jp | 1 DAY |
| 123456789ABCDEF | http:// example.jp/news.cgi | 1 HOUR |
| 123456789ABCDEF | http:// example.jp /menu/ | 1 MONTH |
| D36591BC38268AZ1 | http:// example.jp/news.cgi | 6 HOURS |
| ... | | |

FIG. 9

| TERMINAL ID | URL | FINAL UPDATE DATE AND TIME | FINAL TRANSFER DATE AND TIME | BODY DATA |
|---|---|---|---|---|
| 123456789ABCDEF | http://example.jp | 2008-01-15T08:50:23 | 2008-02-26T10:41:33 | <html><head><title>○○SERVICE</title>... |
| ... | | | | |

FIG. 10

| TERMINAL ID | URL | REGION (x1,y1)-(x2,y2) | DEGREE OF IMPORTANCE (ACCUMULATED DISPLAY TIME) |
|---|---|---|---|
| 123456789ABCDEF | http://example.jp | (0,0)-(320,240) | 10 |
| 123456789ABCDEF | http://example.jp | (230,750)-(810,1050) | 1000 |
| D36591BC38268AZ1 | http://example.jp | (120,200)-(240,360) | 1500 |
| ... | | | |

FIG. 12

| URL | REGION | ACCUMULATED DISPLAY TIME |
|---|---|---|
| http:// example.jp | (0,0) - (320,240) | 1 MINUTE |
| http:// example.jp | (230,750) - (810,1050) | 5 MINUTES |
| http:// example.jp /menu/ | (160,390) - (480,630) | 30 SECONDS |
| ... | | |

FIG. 14

| URL | RELOADING COUNT |
|---|---|
| http://example.jp | 3 |
| http://example.jp /menu/ | 1 |
| ... | |

FIG. 15

| URL | FINAL UPDATE DATE AND TIME | FINAL TRANSFER DATE AND TIME | UPDATE FREQUENCY | BODY DATA |
|---|---|---|---|---|
| http://example.jp | 2008-01-15T08:50:23 | 2008-02-26T10:41:33 | 1 DAY | \<html\>\<head\>\<title\> ○○ SERVICE \</title\>... |
| ... | | | | |

FIG. 16

| URL | REGION (x1,y1)-(x2,y2) | ACCUMULATED DISPLAY TIME |
|---|---|---|
| http://example.jp | (0,0)-(320,240) | 1 SECOND |
| http://example.jp | (230,750)-(810,1050) | 20 MINUTES |

FIG. 17

UPDATE ACCUMULATED DISPLAY TIME OF BLOCK (X2Y10-X8Y18) CORRESPONDING TO DISPLAY REGION PORTION

FIG. 18

| URL | REGION (KEYWORDS INCLUDED) | | ACCUMULATED DISPLAY TIME |
|---|---|---|---|
| | XPath | CHARACTER STRING | |
| http://example.jp | /HTML/BODY/TABLE/TBODY/TR[2]/TD/TABLE/TBODY/TR[26] | MATSUI | 5 MINUTES |
| http://example.jp | /HTML/BODY/TABLE/TBODY/TR[2]/TD/TABLE/TBODY/TR[26] | KIHARA | 5 MINUTES |

FIG. 19

RELAY SERVER, MOBILE TERMINAL, INFORMATION BROWSING SYSTEM AND METHOD THEREOF

CROSS-REFERENCE TO RELATED APPLICATIONS

This application is based upon and claims the benefit of priority of the prior Japanese Patent Application No. 2008-300852, filed on Nov. 26, 2008, the entire contents of which are incorporated herein by reference.

FIELD

The embodiments discussed herein relate to a relay server, mobile terminal, information browsing system and a method thereof for handling information to be updated.

BACKGROUND

In recent years, there are an increasing number of mobile terminals such as mobile phones and PDA's (personal digital assistant) provided with a full browser. Accordingly, access to contents for PC's on a Web server as an information delivery server is expanding.

However, mobile terminals are often connected to a network through wireless communication and are generally more frequently disconnected than PC's connected to a network through wired communication.

Therefore, Japanese Patent Laid-Open No. 2005-316523 discusses a mobile terminal capable of browsing a content on a Web server off-line even if the connection to the network is interrupted. The technique capable of browsing a content on a Web server off-line even if the connection to the network is interrupted transfers the content on the Web server to the inside of a mobile terminal so that the content can be browsed even if the connection to the network is interrupted. However, the user of the mobile terminal needs to explicitly transfer the content on the Web server. Furthermore, even when the content on the Web server is updated, the user of the mobile terminal needs to explicitly transfer the content from the Web server to the mobile terminal again.

Japanese Patent Laid-Open No. 2002-149540 discusses a technique whereby a gate way (GW) server located between a mobile terminal and a Web server checks updates of a content on the Web server side and reports every update of the content to the mobile terminal. According to the technique, updates of the content on the Web server are checked page by page. However, such a page-by-page update check on the content on the Web server regards a change of an access counter whose contents are changed with every access or a change in an advertisement portion as an update.

A "hatena antenna" discusses a function that allows the user to set regions to be checked for updates and regions whose update checks are to be ignored. However, it is difficult to meticulously set regions to be checked for updates and regions whose update checks are to be ignored using a limited input interface of the mobile terminal.

SUMMARY

According to an aspect of an embodiment, a computer implemented method includes periodically requesting an off-line data update processing based on automatic determination of a degree of importance of data and an update frequency, and updating the off-line data based on the requesting and displaying a page of on-line data resulting from the updating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are sequence diagrams illustrating an example of off-line data update processing carried out by the GW server;

FIG. 6 is a configuration diagram illustrating an example of an update schedule DB;

FIG. 7 is a configuration diagram illustrating an example of an HTML cache;

FIG. 8 is a configuration diagram illustrating an example of an update frequency DB;

FIG. 9 is a configuration diagram illustrating an example of an off-line data DB;

FIG. 10 is a configuration diagram illustrating an example of an in-page degree of importance DB;

FIG. 12 is a configuration diagram illustrating an example of a region display time DB;

FIG. 14 is a configuration diagram illustrating an example of a reloading count DB;

FIG. 15 is a configuration diagram illustrating an example of the off-line data DB;

FIG. 16 illustrates a first method of target region determination performed by a display region acquisition section;

FIG. 17 illustrates a second method of target region determination performed by the display region acquisition section;

FIG. 18 illustrates a third method of target region determination performed by the display region acquisition section;

FIG. 19 illustrates fourth and fifth methods of target region determination performed by the display region acquisition section;

DESCRIPTION OF EMBODIMENTS

Hereinafter, embodiments will be explained with reference to the accompanying drawings. A Web server will be explained according to an embodiment as an example of an information delivery server, but the information delivery server may be any server or apparatus that provides information to be updated. Moreover, a GW server will be explained an example of a relay server, but the relay server may be any terminal or apparatus that provides information delivered from the information delivery server as off-line data to a mobile terminal.

Figure 1:
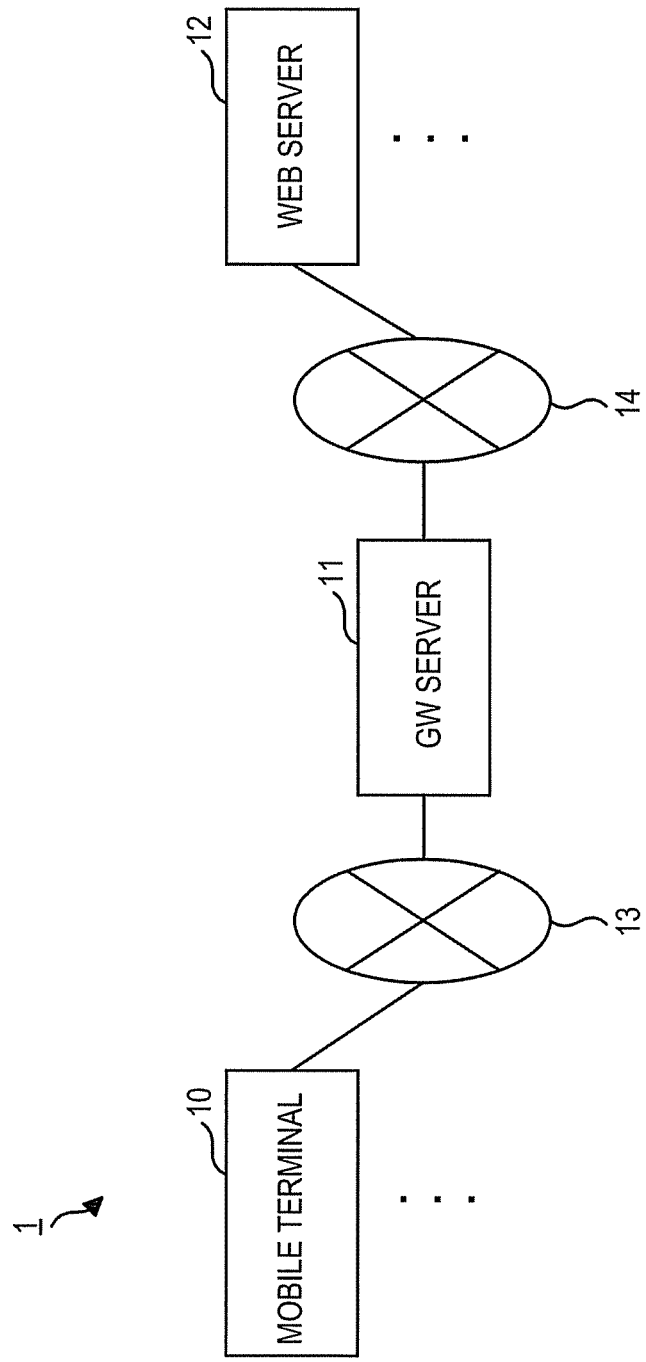
FIG. 1 is a configuration diagram illustrating an example of an information browsing system according to an embodiment.

FIG. 1 is a configuration diagram illustrating an example of an information browsing system according to an embodiment. The information browsing system 1 in FIG. 1 includes a mobile terminal 10, a GW server 11, a Web server 12, a wireless communication network 13 and a wired communication network 14.

The GW server 11 is connected to at least one mobile terminal 10 via the wireless communication network 13 such as a wireless LAN. The GW server 11 is connected to at least one Web server 12 via the wired communication network 14 such as the Internet. The GW server 11 connects the wireless communication network 13 and the wired communication network 14, which are different networks.

Figure 2:
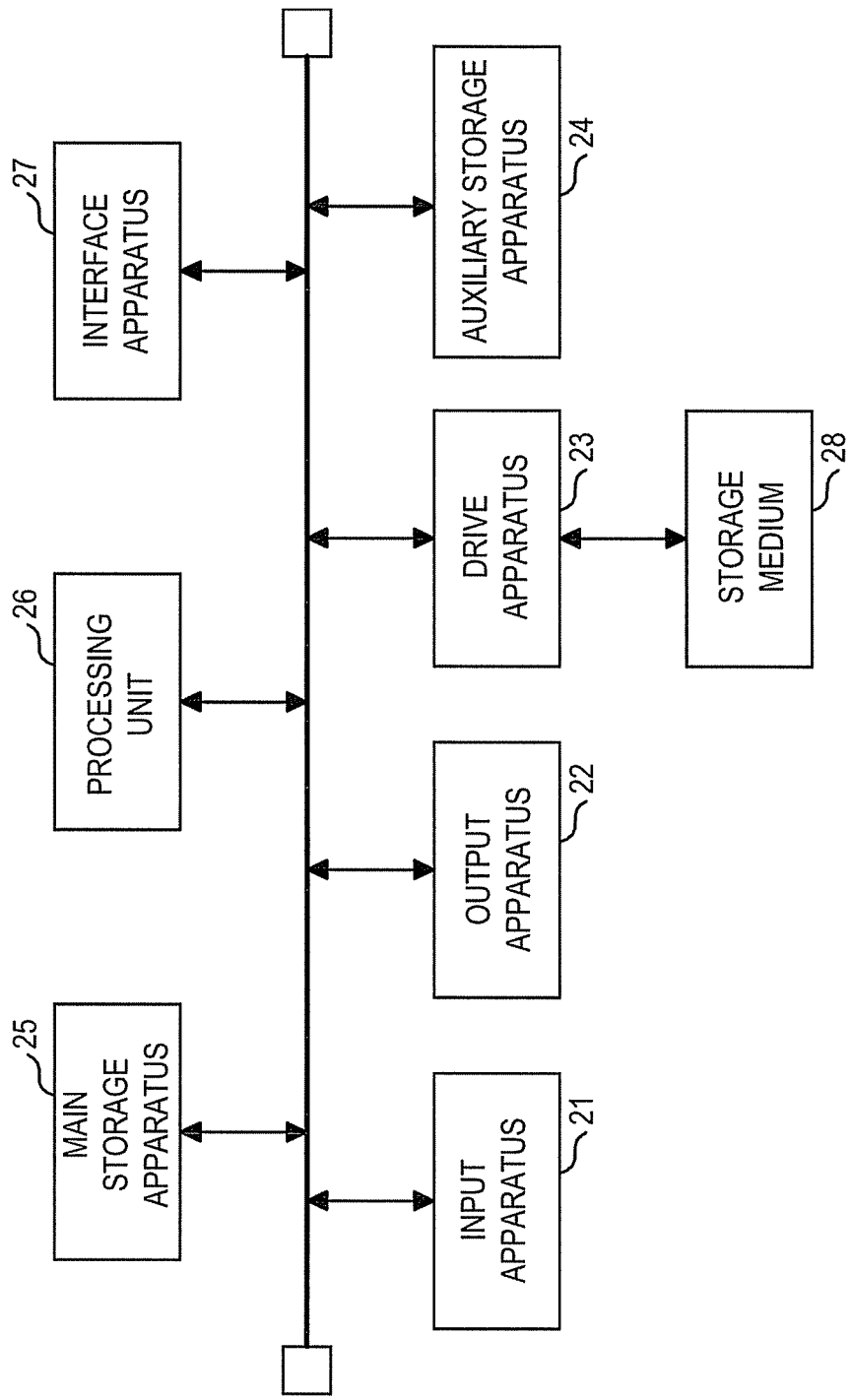
FIG. 2 is a hardware configuration diagram illustrating an example of a computer system.

The mobile terminal 10, GW server 11 and Web server 12 in FIG. 1 may be realized by a computer system in a hardware configuration as illustrated in FIG. 2, for example.

FIG. 2 is a hardware configuration diagram illustrating an example of a computer system. The computer system in FIG. 2 includes an input apparatus 21, an output apparatus 22, a drive apparatus 23, an auxiliary storage apparatus 24, a main storage apparatus 25, a processing unit 26 and an interface apparatus 27 interconnected with each other via a bus.

The input apparatus 21 includes a keyboard and mouse or the like and inputs various signals. The output apparatus 22 includes a display apparatus or the like and displays various windows and data or the like. The interface apparatus 27 includes a modem, wired/wireless LAN card or the like and is used to make connections with the wireless communication network 13 and wired communication network 14.

A program for causing the computer system in FIG. 2 to function as the mobile terminal 10, GW server 11 or Web server 12 is delivered through distribution of a computer readable recording or storage medium 28 or delivered through downloading or the like from the wireless communication network 13 or the wired communication network 14. For the recording medium 28 that records the program, a recording medium that optically, electrically or magnetically records information onto a CD-ROM, flexible disk or magneto-optical disk or a semiconductor memory that electrically records information such as a ROM and flash memory may be used.

When the recording medium 28 in which the program is recorded is set in the drive apparatus 23, the program is installed from the recording medium 28 into the auxiliary storage apparatus 24 via the drive apparatus 23. A program downloaded from the wireless communication network 13 or wired communication network 14 is installed into the auxiliary storage apparatus 24 via the interface apparatus 27.

The auxiliary storage apparatus 24 stores the installed program and also stores necessary files and data or the like. The main storage apparatus 25 reads a necessary program from the auxiliary storage apparatus 24 at startup of the computer and stores the program. The processing unit 26 realizes various types of processing, which is described in detail below, according to the program stored in the main storage apparatus 25.

Figure 3:
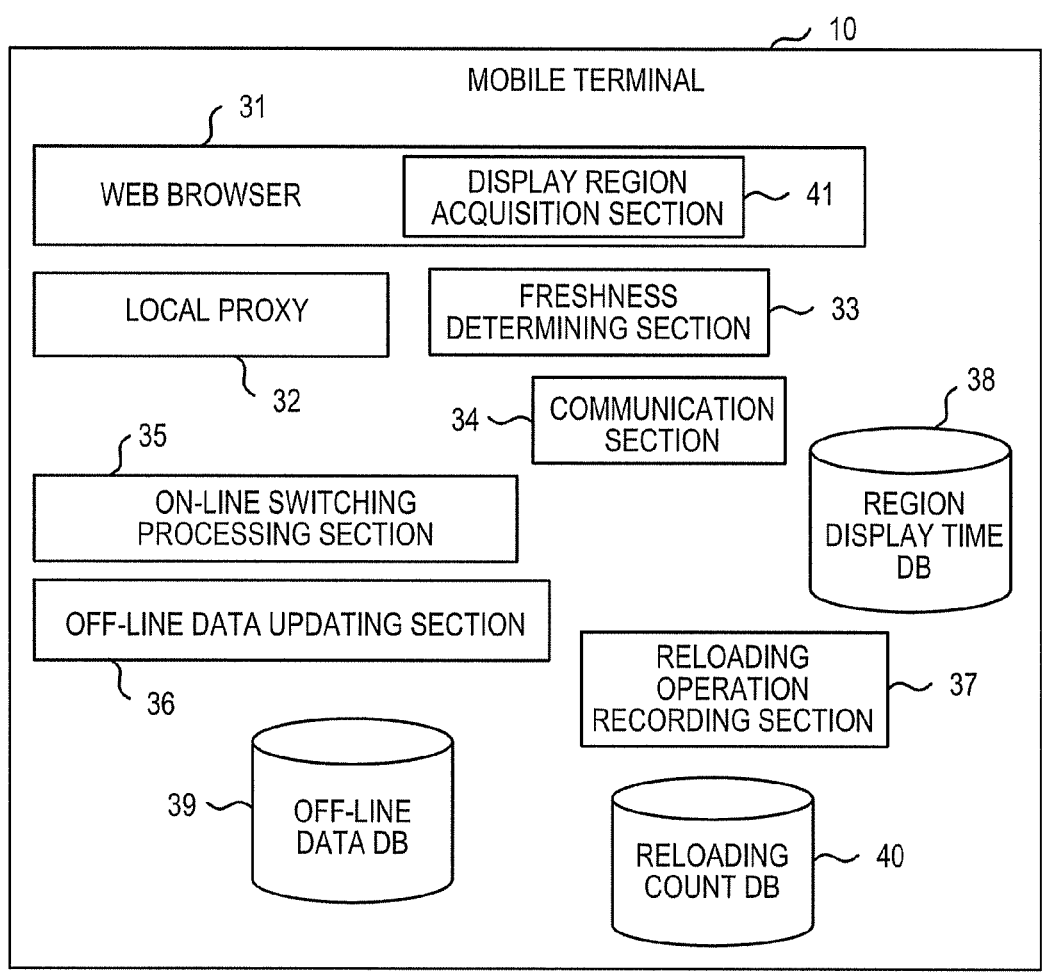
FIG. 3 is a block configuration diagram illustrating an example of a mobile terminal.

FIG. 3 is a block configuration diagram illustrating an example of a mobile terminal. The mobile terminal 10 in FIG. 3 includes a Web browser 31, a local proxy 32, a freshness determining section 33, a communication section 34, an on-line switching processing section 35, an off-line data updating section 36, a reloading operation recording section 37, a region display time DB 38, an off-line data DB 39 and a reloading count DB 40. The Web browser 31 includes a display region acquisition section 41.

The Web browser 31, local proxy 32, freshness determining section 33, communication section 34, on-line switching processing section 35, off-line data updating section 36, reloading operation recording section 37, region display time DB 38, off-line data DB 39 and reloading count DB 40 are realized by, for example, the processing unit 26 (FIG. 2) executing the program.

Details of the Web browser 31, local proxy 32, freshness determining section 33, communication section 34, on-line switching processing section 35, off-line data updating section 36, reloading operation recording section 37, region display time DB 38, off-line data DB 39 and reloading count DB 40 are described in detail below.

Figure 4:
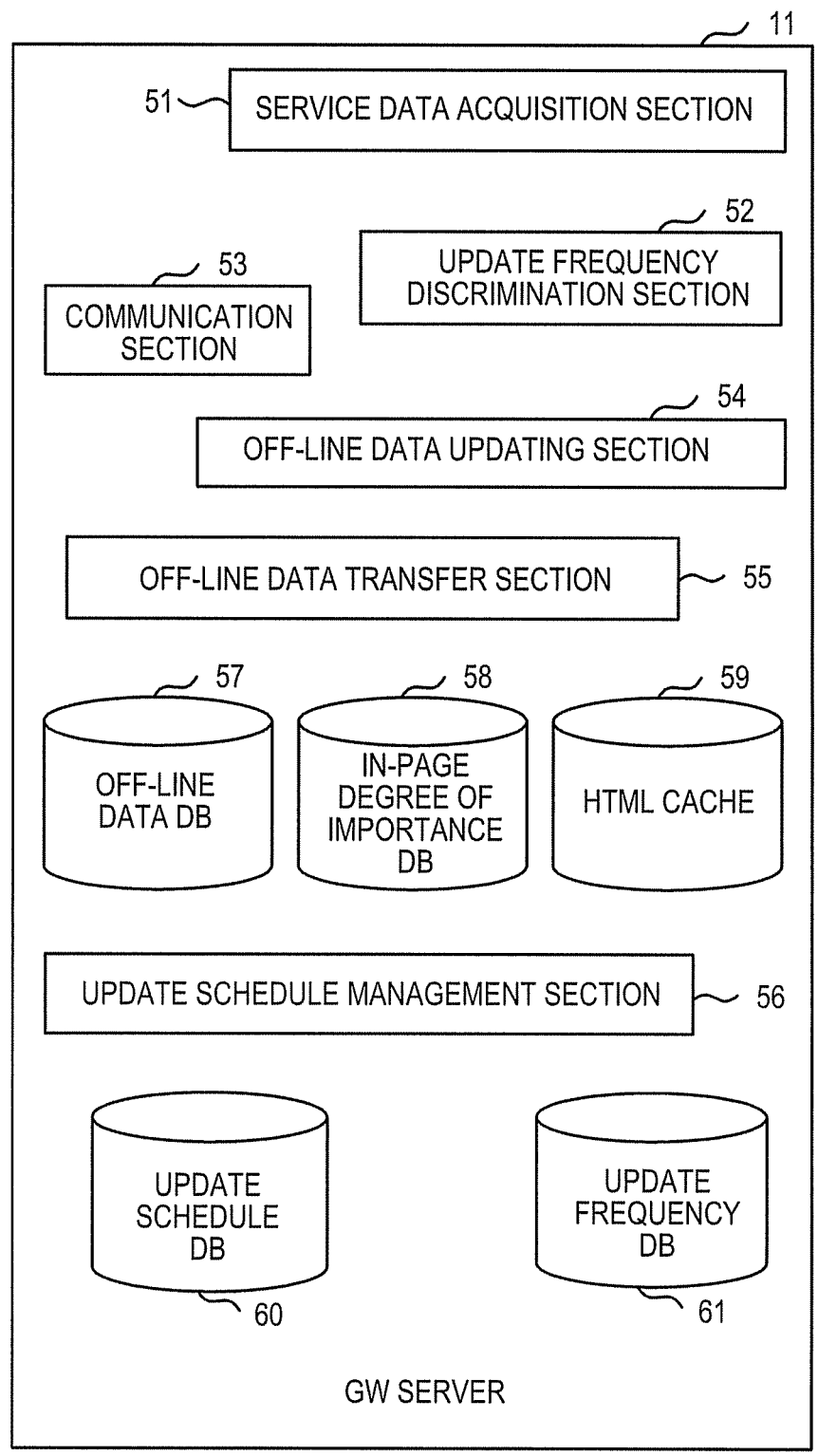
FIG. 4 is a block configuration diagram illustrating an example of a GW server.

FIG. 4 is a block configuration diagram illustrating an example of a GW server. The GW server 11 in FIG. 4 includes a service data acquisition section 51, an update frequency discrimination section 52, a communication section 53, an off-line data updating section 54, an off-line data transfer section 55, an update schedule management section 56, an off-line data DB 57, an in-page degree of importance DB 58, an HTML cache 59, an update schedule DB 60 and an update frequency DB 61.

The service data acquisition section 51, update frequency discrimination section 52, communication section 53, off-line data updating section 54, off-line data transfer section 55, update schedule management section 56, off-line data DB 57, in-page degree of importance DB 58, HTML cache 59, update schedule DB 60 and update frequency DB 61 are realized by, for example, the processing unit 26 (FIG. 2) executing the program.

Details of the service data acquisition section 51, update frequency discrimination section 52, communication section 53, off-line data updating section 54, off-line data transfer section 55, update schedule management section 56, off-line data DB 57, in-page degree of importance DB 58, HTML cache 59, update schedule DB 60 and update frequency DB 61 are described in detail below.

Here, off-line data update processing carried out by the GW server 11 will be explained with reference to FIG. 4. The update schedule management section 56 of the GW server 11 periodically requests the off-line data updating section 54 to start off-line data update processing based on a schedule stored in the update schedule DB 60. The off-line data updating section 54 requests the service data acquisition section 51 to start the off-line data update processing.

Upon receiving the request to start the off-line data update processing from the off-line data updating section 54, the service data acquisition section 51 acquires latest data of a Web page (hereinafter referred to as "page") from the Web server 12. The service data acquisition section 51 causes the HTML cache 59 to store the latest data acquired from the Web server 12.

The update frequency discrimination section 52 determines the update frequency of each page with reference to a degree of importance per region of each page stored in the in-page degree of importance DB 58. The update frequency discrimination section 52 updates the update frequency of each page stored in the update frequency DB 61 based on the update frequency of each page.

When the update frequency of each page stored in the update frequency DB 61 is updated, the update schedule management section 56 updates the schedule stored in the update schedule DB 60 according to a new update frequency.

The update frequency discrimination section 52 determines whether or not the latest data acquired from the Web server 12 has been updated using the degree of importance per region of each page stored in the in-page degree of importance DB 58. The update frequency discrimination section 52 determines that the latest data has been updated when, for example, an update is detected in a region whose degree of importance is equal to or greater than a threshold. On the other hand, the update frequency discrimination section 52 determines that the latest data has not been updated when no update is detected in the region whose degree of importance is equal to or greater than the threshold although an update is detected in a region whose degree of importance is less than the threshold.

Upon determining that the latest data acquired from the Web server 12 has been updated, the off-line data updating section 54 updates the off-line data DB 57 with the latest data determined to have been updated out of the latest data stored in the HTML cache 59.

Here, the off-line data referencing processing carried out by the mobile terminal 10 will be explained with reference to FIG. 3. First, the user browses the off-line data stored in the off-line data DB 39 using the Web browser 31 of the mobile terminal 10. The local proxy 32 of the mobile terminal 10 acquires the page specified by the Web browser 31 from the off-line data DB 39 and returns the page to the Web browser 31. When the page is displayed on the Web browser 31 for a predetermined time or more, the display region acquisition section 41 causes the region display time DB 38 to store a display time per region.

The on-line switching processing section 35 does not wait for the user to explicitly perform a reloading operation about the page whose latest information needs to be always referenced off-line within a content (e.g., seat reservation situation of Shinkansen (the New Trunk Line)) and automatically determines the necessity for an off-line reference simultaneously with the page display of the off-line data stored in the off-line data DB 39. Upon determining that on-line reference is necessary, the on-line switching processing section 35 makes an on-line connection with the Web server 12, acquires the latest data and updates the page display of off-line data to a page display of on-line data. This saves the user from having to manually specify and perform a reloading operation.

A page of off-line data is displayed such that real-time information within a page whose latest information within a content should always be referenced on-line is displayed, for example, in light color or with small characters. By this means, the on-line switching processing section 35 can indicate to the user that the real-time information displayed is not the latest but is being acquired from the Web server 12.

The freshness determining section 33 determines whether or not real-time information (information whose latest information should always be referenced on-line) is included in the page. When the freshness determining section 33 determines that real-time information is included in the page, the on-line switching processing section 35 automatically makes an on-line connection with the Web server 12, acquires latest data and replaces the page display of off-line data by the page display of on-line data.

Here, the processing of the mobile terminal 10 at the time of off-line data update will be explained with reference to FIG. 3 and FIG. 4. For example, while browsing a page of off-line data stored in the off-line data DB 39 using the Web browser 31 of the mobile terminal 10, if the user wants to browse the latest information of the page, the user performs a reloading operation from the Web browser 31.

When the user performs the reloading operation, the reloading operation recording section 37 updates a reloading count stored in the reloading count DB 40. The off-line data updating section 36 of the mobile terminal 10 transmits a reloading URL, contents stored in the reloading count DB 40 and contents stored in the region display time DB 38 from the communication section 34 to the GW server 11.

The communication section 53 of the GW server 11 receives the reloading URL, contents stored in the reloading count DB 40 and contents stored in the region display time DB 38 from the communication section 34 of the mobile terminal 10. The communication section 53 requests the off-line data updating section 54 to update the off-line data by specifying the received reloading URL.

The off-line data updating section 54 requests the service data acquisition section 51 to start off-line data update processing by specifying a reloading URL. Upon receiving the request to start off-line data update processing, the service data acquisition section 51 acquires the latest data of the page corresponding to the reloading URL from the Web server 12. The service data acquisition section 51 causes the HTML cache 59 to store the latest data acquired from the Web server 12.

The off-line data transfer section 55 updates the in-page degree of importance DB 58 based on the contents uploaded from the mobile terminal 10 and stored in the region display time DB 38. The off-line data transfer section 55 updates the update frequency DB 61 based on the contents uploaded from the mobile terminal 10 and stored in the reloading count DB 40.

The off-line data transfer section 55 acquires off-line data of the page corresponding to the reloading URL from the off-line data DB 57, acquires an update frequency of each URL of the acquired off-line data from the update frequency DB 61 and creates an off-line data archive for transfer. The off-line data transfer section 55 transfers the created off-line data archive for transfer from the communication section 53 to the mobile terminal 10.

The communication section 34 of the mobile terminal 10 receives the off-line data archive for transfer from the communication section 53 of the GW server 11. The communication section 34 passes the received off-line data archive for transfer to the off-line data updating section 36. The off-line data updating section 36 unarchives the off-line data archive for transfer and updates the off-line data stored in the off-line data DB 39. The local proxy 32 acquires the data of the page corresponding to the reloading URL from the off-line data DB 39 and returns the data to the Web browser 31.

Here, details of the off-line data update processing carried out by the GW server 11 will be explained with reference to a sequence diagram. The GW server 11 periodically makes an update check of pages stored in the Web server 12 and performs processing of updating data of pages stored in the off-line data DB 57 when an update is detected.

FIGS. 5A and 5B are sequence diagrams illustrating an example of off-line data update processing carried out by the GW server 11. The update schedule management section 56 of the GW server 11 starts to periodically execute off-line data update processing at a minimum update check frequency/interval (operation S1).

The update schedule management section 56 acquires a URL list requiring an update check at a current date and time from the update schedule DB 60 (operation S2). FIG. 6 is a configuration diagram illustrating an example of the update schedule DB. The update schedule DB 60 in FIG. 6 stores a schedule to make an update check of a content on the Web server 12.

The update schedule DB 60 includes URL, update check frequency and final check date and time as data items. The update schedule management section 56 can determine the URL requiring an update check at the current date and time from the update check frequency and final check date and time stored in the update schedule DB 60. The update schedule as illustrated in FIG. 6 may be defined by the system 1 and/or a user. For example, based on a type of data (i.e., likelihood of frequent changes/updates), the update schedule may indicate frequent updates.

The update schedule management section 56 performs the following update check on each URL included in the URL list acquired in operation S2 (operation S3). The update schedule management section 56 requests the off-line data updating section 54 to make an update check by specifying a URL (operation S4).

The off-line data updating section 54 requests the service data acquisition section 51 to acquire latest data by specifying a URL (operation S5). The service data acquisition section 51 acquires the latest data of the page corresponding to the specified URL (operation S6). The service data acquisition section 51 updates contents stored in the HTML cache 59 with the latest data acquired from the Web server 12 (operation S7).

FIG. 7 is a configuration diagram illustrating an example of the HTML cache. The HTML cache 59 in FIG. 7 stores HTML and a content such as an image acquired (downloaded) from the Web server 12. The HTML cache 59 includes URL, final update date and time, and body data as data items. That is, the service data acquisition section 51 updates the URL, final update date and time, and body data stored in the HTML cache 59 with the latest data acquired from the Web server 12. While content is illustrated as being an image, the present invention is not limited thereto.

The off-line data updating section 54 specifies a URL and acquires a list of terminal ID's of mobile terminals 10 checking the specified URL from the update frequency DB 61 (operation S8).

FIG. 8 is a configuration diagram illustrating an example of an update frequency DB. The update frequency DB 61 in FIG. 8 stores an update frequency of each page.

As illustrated in the update frequency DB 61 in FIG. 8, the update frequency for a certain URL has a value which differs from one terminal ID to another. Since a target region within a certain URL differs from one mobile terminal 10 to another or the update frequency differs from one region to another within a certain URL, the update frequency corresponding to the certain URL has a value which differs from one terminal ID to another. The update frequency DB 61 includes terminal ID, URL and update frequency (update interval) as data items.

The information browsing system 1 in FIG. 1 makes an update check of a content on the Web server 12 and updates off-line data stored in the mobile terminal 10 based on the update frequency stored in the update frequency DB 61.

The off-line data updating section 54 performs the following off-line data update on each terminal ID included in the list of terminal ID's acquired in operation S8 (operation S9). The off-line data updating section 54 requests the update frequency discrimination section 52 to make an update frequency check of off-line data by specifying a URL and user ID (operation S10).

The update frequency discrimination section 52 acquires data (old HTML) from the off-line data DB 57 by specifying a terminal ID and URL (operation S11). FIG. 9 is a configuration diagram illustrating an example of the off-line data DB. The off-line data DB 57 in FIG. 9 stores data which becomes a source to create off-line data to be transferred to the mobile terminal 10.

The off-line data DB 57 includes terminal ID, URL, final update date and time, final transfer date and time, body data as data items. That is, the update frequency discrimination section 52 acquires final update date and time, final transfer date and time, and body data from the off-line data DB 57 by specifying a terminal ID and URL.

The update frequency discrimination section 52 acquires data (new HTML) from the HTML cache 59 by specifying a URL (operation S12). The data (new HTML) acquired in operation S12 becomes final update date and time, and body data.

The update frequency discrimination section 52 acquires an in-page importance degree list from the in-page degree of importance DB 58 by specifying a terminal ID and URL (operation S13). FIG. 10 is a configuration diagram illustrating an example of the in-page degree of importance DB. The in-page degree of importance DB 58 in FIG. 10 stores regions in each page on which the mobile terminal 10 focuses attention. As illustrated in the in-page degree of importance DB 58, regions of focus of attention within a certain URL differ from one mobile terminal 10 to another. The in-page degree of importance DB 58 includes terminal ID, URL, region (x1, y1)-(x2, y2), and degree of importance (accumulated display time) as data items. The update frequency discrimination section 52 acquires the region (x1, y1)-(x2, y2), degree of importance (accumulated display time) from the in-page degree of importance DB 58 by specifying a terminal ID and URL.

The update frequency discrimination section 52 calculates an update frequency of each page described in detail below with reference to a degree of importance per region of the page of each URL acquired from the in-page degree of importance DB 58 (operation S14).

The update frequency discrimination section 52 updates the update frequency of the update frequency DB 61 by specifying a terminal ID, URL and update frequency (operation S15). The update frequency discrimination section 52 requests the update schedule management section 56 to update the update check frequency by specifying a URL and update frequency (operation S16). The update schedule management section 56 acquires the current update check frequency from the update schedule DB 60 by specifying a URL (operation S17).

The update schedule management section 56 compares the update frequency specified by the update frequency discrimination section 52 in operation S16 with the update check frequency acquired from the update schedule DB 60 in operation S17 (operation S18).

When the update frequency (new update check frequency) specified by the update frequency discrimination section 52 in operation S16 is greater than the update check frequency (current update check frequency) acquired from the update schedule DB 60, the update schedule management section 56 ignores a request for update of the update check frequency in operation S16.

On the other hand, when the update frequency (new update check frequency) specified from the update frequency discrimination section 52 in operation S16 is smaller than the update check frequency (current update check frequency) acquired from the update schedule DB 60, the update schedule management section 56 updates the update check frequency of the update schedule DB 60 to a new update check frequency by specifying a URL (operation S19).

The update frequency discrimination section 52 returns information as to whether or not a flag indicating an update is set, that is, whether or not a target region within a new HTML is updated to the off-line data updating section 54 based on the result of operation S107 or operation S208 in the update frequency discrimination processing in operation S14 (operation S20).

When the target region within the new HTML is not updated, the off-line data updating section 54 ignores the target region even if regions other than the target region within the new HTML have been updated (operation S21). When the target region within the new HTML has been updated, the off-line data updating section 54 acquires a new HTML from the HTML cache 59 by specifying a URL (operation S22).

The off-line data updating section 54 updates the old HTML stored in the off-line data DB 57 to the new HTML acquired in operation S22 by specifying a terminal ID and URL (operation S23). To be more specific, the off-line data updating section 54 updates the final update date and time, final transfer date and time, and body data stored in the off-line data DB 57 by specifying a terminal ID and URL. The update schedule management section 56 updates the final check date and time of the update schedule DB 60 by specifying a URL (operation S24).

The processing of creating the off-line data DB 57 from the beginning (from 0) is performed when a new service (content) on the Web server 12 is added to the information browsing system 1 or when a new mobile terminal 10 is added. The processing of creating the off-line data DB 57 from the beginning is as follows.

In the processing of creating the off-line data DB 57 from the beginning, the service data acquisition section 51 starts cyclic processing with a URL specified, performs the processing from operation S4 onward of the sequence diagram illustrated in FIGS. 5A and 5B on all URL's included in the HTML of the specified URL and thereby creates off-line data.

Details of the off-line data referencing processing carried out by the mobile terminal 10 will be explained with reference to a sequence diagram here. When the user attempts to access the Web server 12 whose off-line data is stored in the off-line data DB 39 using the Web browser 31 on the mobile terminal 10, the local proxy 32 reads an HTML file and image file corresponding to a specified URL from the off-line data DB 39 and returns the files, and the user can thereby browse the content of the Web server 12 even while being off-line. While browsing of a page, if a region in the page is displayed for a predetermined time or more, the accumulated display time of each region is updated.

Figure 11:
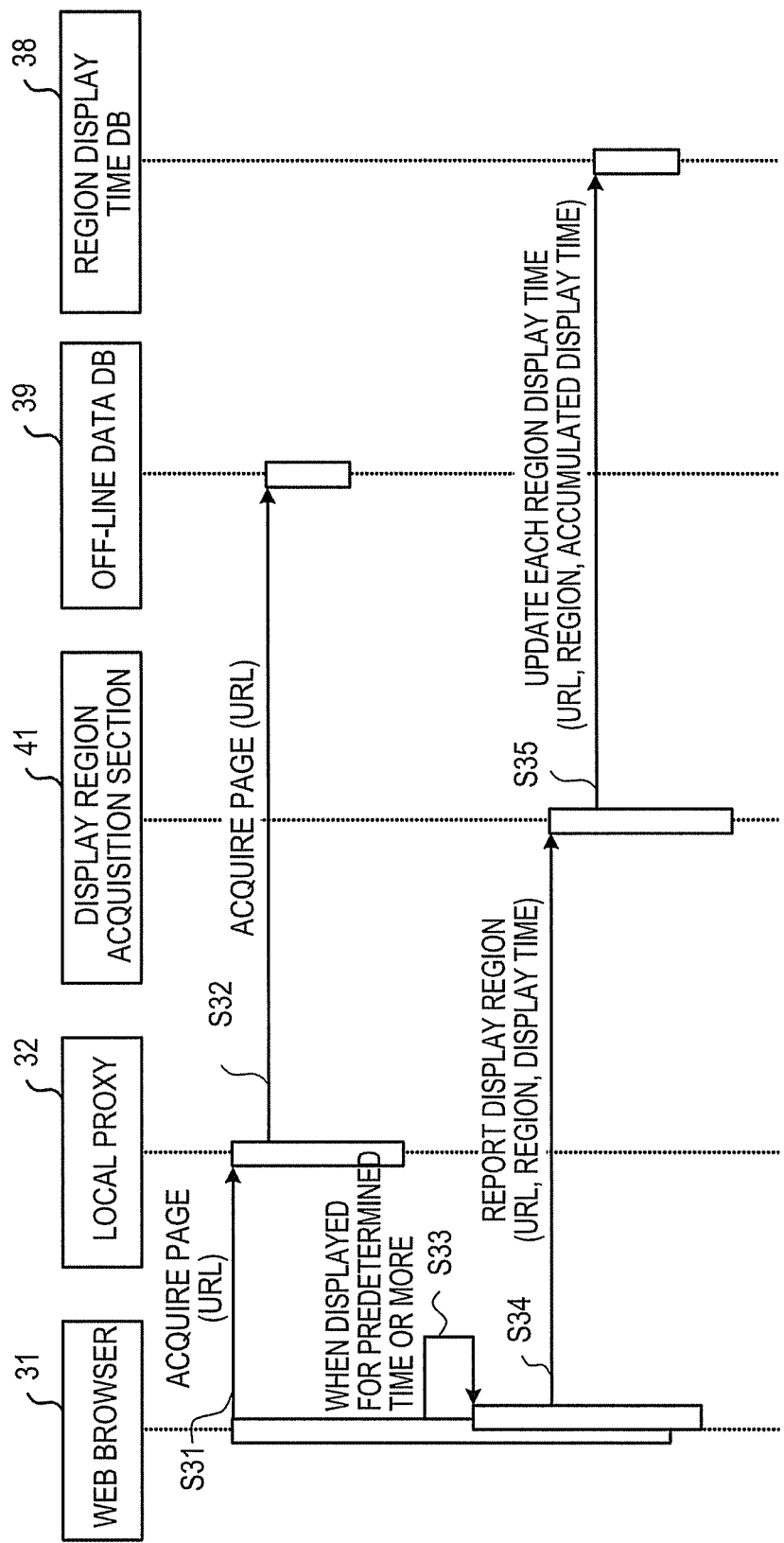
FIG. 11 is a sequence diagram illustrating an example of off-line data referencing processing carried out by the mobile terminal.

FIG. 11 is a sequence diagram illustrating an example of off-line data referencing processing carried out by the mobile terminal 10. When the user attempts to access the Web server 12 whose off-line data is stored in the off-line data DB 39 using the Web browser 31 on the mobile terminal 10 by specifying a URL, the Web browser 31 requests the local proxy 32 to acquire the page by specifying the URL (operation S31).

The local proxy 32 acquires the page from the off-line data DB 39 by specifying a URL and returns the page to the Web browser 31 (operation S32). Suppose a region in the page has been displayed for a predetermined time or more on the Web browser 31 (operation S33). The Web browser 31 reports the display region to the display region acquisition section 41 by specifying a URL, region and display time (operation S34). The display region acquisition section 41 updates the accumulated display time of the region display time DB 38 based on the URL, region and display time included in the display region report from the Web browser 31 (operation S35).

FIG. 12 is a configuration diagram illustrating an example of a region display time DB. The region display time DB 38 in FIG. 12 stores an accumulated display time of each region in the page. The region display time DB 38 in FIG. 12 includes URL, region and accumulated display time as data items.

Details of the mobile terminal 10 at the time of off-line data update will be explained with reference to a sequence diagram here. For example, while browsing a page of off-line data stored in the off-line data DB 39 using the Web browser 31 of the mobile terminal 10, if the user wants to browse the latest information of the page, the user performs a reloading operation from the Web browser 31.

When the user performs the reloading operation, the mobile terminal 10 makes an on-line connection with the GW server 11 and acquires a latest version of the page which is the reloading target. In this case, the mobile terminal 10 also updates the off-line data stored in the off-line data DB 39 simultaneously.

The off-line data stored in the off-line data DB 39 of the mobile terminal 10 is updated not only at the time of reloading operation but also when the final update date and time of the off-line data becomes old relative to the update frequency. The processing in this case corresponds to operations S46 to S62 illustrated in the sequence diagram of FIGS. 13A and 13B which is described in detail below.

The GW server 11 stores upload data during an on-line connection in the in-page degree of importance DB 58 so as to be used to update future off-line data using the accumulated display time per region in each uploaded URL as the degree of importance. Furthermore, when the reloading count of each uploaded URL is large, the GW server 11 sets the update frequency of the off-line data higher frequency.

Figure 13A:
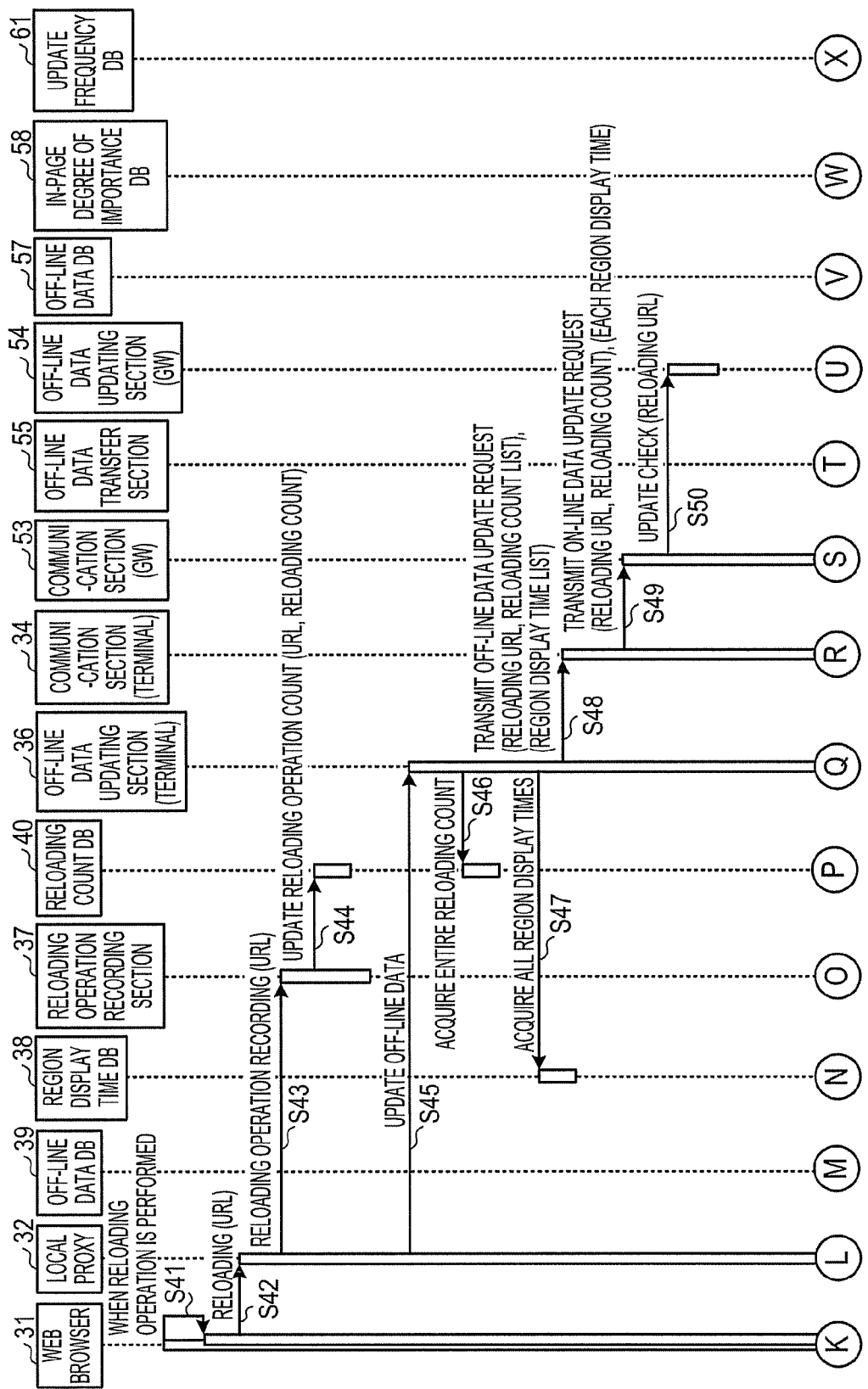
FIGS. 13A and 13B are sequence diagrams illustrating an example of processing at the time of off-line data update of the mobile terminal.
Figure 13B:
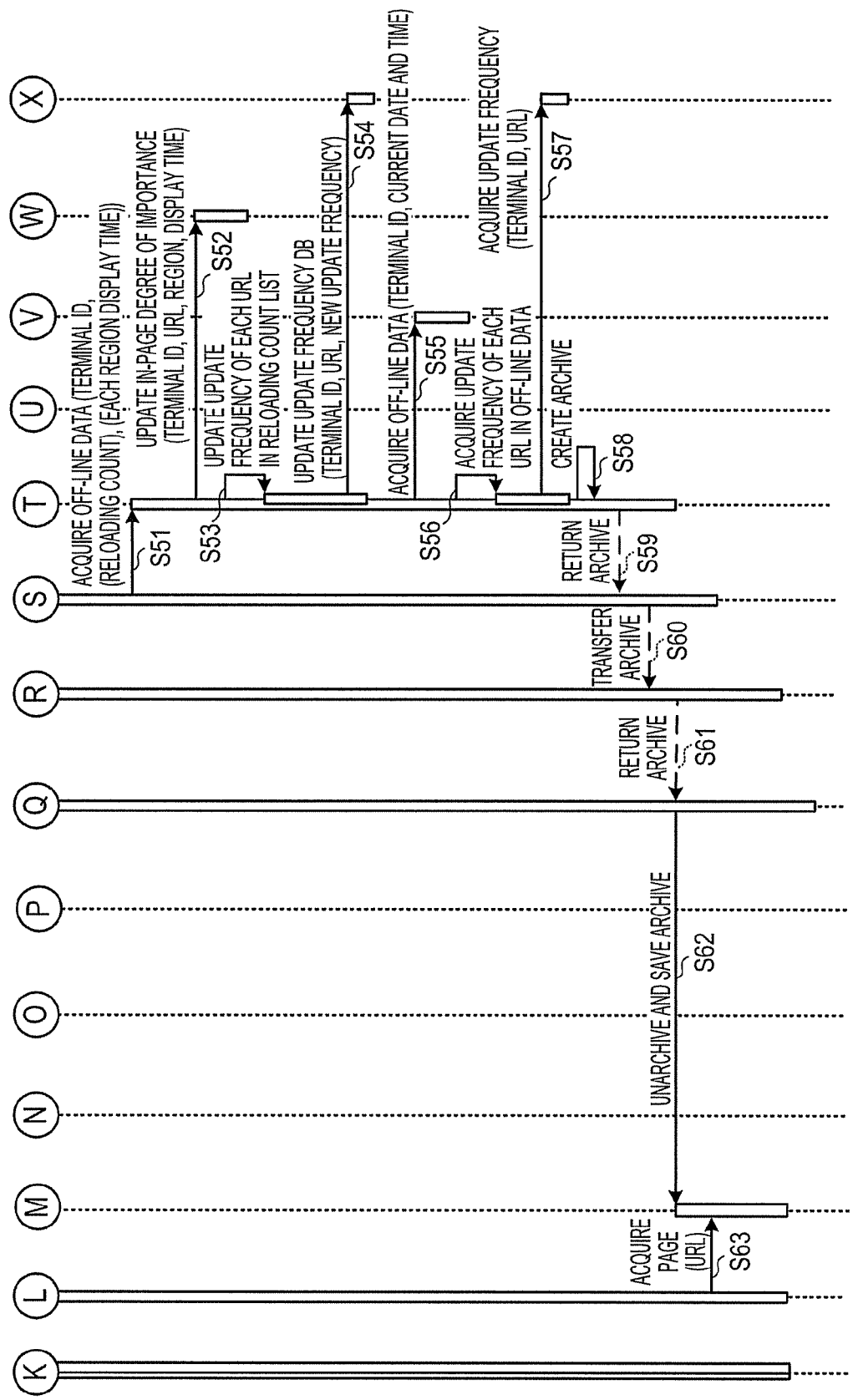

FIGS. 13A and 13B are sequence diagrams illustrating an example of processing at the time of off-line data update of the mobile terminal 10. When the user performs a reloading operation (operation S41), the Web browser 31 requests the local proxy 32 for reloading by specifying a URL (operation S42).

The local proxy 32 requests the reloading operation recording section 37 to record the reloading operation by specifying a URL (operation S43). The reloading operation recording section 37 updates the reloading count stored in the reloading count DB 40 based on the specified URL (operation 44).

FIG. 14 is a configuration diagram illustrating an example of a reloading count DB. The reloading count DB 40 in FIG. 14 stores the reloading count of the reloading operation carried out by the user for each page. The reloading count DB 40 includes URL and reloading count as data items.

The local proxy 32 requests the off-line data updating section 36 to update the off-line data (operation S45). The off-line data updating section 36 acquires a reloading count list including all combinations of URL's and reloading counts from the reloading count DB 40 (operation S46). The off-line data updating section 36 acquires each region display time list including all combinations of URL's, regions and accumulated display times from the region display time DB 38 (operation S47).

The off-line data updating section 36 requests the communication section 34 to transmit an off-line data update request including the reloading URL, reloading count list and each region display time list (operation S48). The communication section 34 transmits the off-line data update request including the reloading URL, reloading count list and each region display time list to the communication section 53 of the GW server 11 (operation S49).

Upon receiving the off-line data update request including the reloading URL, reloading count list and each region display time list from the communication section 34 of the mobile terminal 10, the communication section 53 requests the off-line data updating section 54 to make an update check by specifying the reloading URL (operation S50). The update check carried out by the off-line data updating section 54 is similar to the aforementioned periodically carried out update check.

The communication section 53 transmits the off-line data acquisition request including the terminal ID, reloading count list and each region display time list to the off-line data transfer section 55 (operation S51). The off-line data transfer section 55 updates the in-page degree of importance DB 58 by specifying a terminal ID, URL, region and accumulated display time (operation S52).

The off-line data transfer section 55 extracts the URL included in the reloading count list and updates the update frequency of each extracted URL (operation S53). The off-line data transfer section 55 updates the update frequency DB 61 with the terminal ID, URL and the new update frequency updated in operation S53 (operation S54).

The off-line data transfer section 55 acquires body data which are the HTML file and image file or the like updated after the previous off-line data transfer from the off-line data DB 57 by specifying a terminal ID and current date and time (operation S55).

The off-line data transfer section 55 starts to acquire the update frequency of the URL corresponding to each piece of body data acquired in operation S55 (operation S56). The off-line data transfer section 55 acquires the update frequency from the update frequency DB 61 by specifying a terminal ID and URL (operation S57). The off-line data transfer section 55 creates an off-line data archive for transfer from the body data which are the HTML file and image file or the like acquired from the off-line data DB 57 in operation S55 and the update frequency acquired in operation S57 (operation S58).

In operations S59 to S61, the off-line data archive for transfer is transferred from the off-line data transfer section 55 of the GW server 11 to the off-line data updating section 36 of the mobile terminal 10 via the communication section 53 of the GW server 11 and the communication section 34 of the mobile terminal 10. The off-line data updating section 36 unarchives the off-line data archive for transfer and saves the unarchived off-line data in the off-line data DB 39 (operation S62).

FIG. 15 is a configuration diagram illustrating an example of the off-line data DB. The off-line data DB 39 in FIG. 15 stores body data of each URL and related information (final update date and time, final transfer date and time, and update frequency). The off-line data DB 39 includes URL, final update date and time, final transfer date and time, update frequency and body data as data items.

The local proxy 32 then acquires data of the page of the reloading URL from the off-line data DB 39 (operation S63). The local proxy 32 returns the data of the page corresponding to the reloading URL acquired in operation S63 to the Web browser 31.

In the processing at the time of off-line data update illustrated in FIGS. 13A and 13B, when an off-line data archive to be transferred to the mobile terminal 10 is created, it is also possible to adopt a method of transferring the difference from the off-line data already stored in the mobile terminal 10 and merging the difference on the mobile terminal 10 side. Furthermore, in the processing at the time of off-line data update illustrated in FIGS. 13A and 13B, when an off-line data archive to be transferred to the mobile terminal 10 is created, it is also possible to adopt a method of transferring only a target region which is described in detail below.

Examples of the target region determination method carried out by the display region acquisition section 41 include four methods described below. In addition, a method of extracting a region where scrolling becomes slow as a target region.

A first method of target region determination performed by the display region acquisition section 41 may be such that the mobile terminal 10 side places importance on the update of a region with a long display time, whereas the mobile terminal 10 does not give much consideration to updates of other regions. FIG. 16 is an image diagram of the first method of target region determination performed by the display region acquisition section 41.

In FIG. 16, the display region acquisition section 41 of the mobile terminal 10 stores regions 102 and 103 on a page 100 displayed for a predetermined time or more in a screen size 101 of the mobile terminal 10 as target regions in the region display time DB 38.

A second method of target region determination performed by the display region acquisition section 41 may be such that a page displayed on the mobile terminal 10 is delimited in predetermined units and importance is placed on an update of each predetermined delimitation unit. FIG. 17 is an image diagram of the second method of the target region determination carried out by the display region acquisition section 41.

In FIG. 17, an accumulated display time of each block is recorded in units of a block of 8×8 pixels on a page 100. For example, in FIG. 17, each block is expressed by XY coordinates and the accumulated display time of each block (X2Y10-X8Y18) of the display region portion expressed by a screen size 101 of the mobile terminal 10 is updated.

A third method of target region determination performed by the display region acquisition section 41 may be such that importance is placed on an update around a character string included in the display region of the screen size 101 of the mobile terminal 10. For example, according to the first target region determination method, when emergency news or the like is inserted and the display is thereby shifted, attention may be focused on an unintended region.

In order to correctly judge the target region even when emergency news or the like is inserted and the display is thereby shifted, according to the third method of the target region determination, a target region is extracted based on a character string included in the display region.

The display region acquisition section 41 extracts a target region based on the character string included in the display region. When extraction processing is performed on the entire page 100 in this case, the processing load is large, and therefore the display region acquisition section 41 extracts a character string from a region having a long display time. Using a method of specifying a region by simply using only a character string, it is difficult to specify the region when the same character string is included.

Therefore, the third method of target region determination calculates XPath corresponding to the top left of the display region based on the HTML structure, lists character strings included in the display region, combines XPath corresponding to the location at the top left of the display region and the character strings included in the display region, stores the character strings in the region display time DB 38 illustrated in FIG. 18, and can thereby allow the region to be specified.

A fourth method of target region determination performed by the display region acquisition section 41 may be such that the mobile terminal 10 side places importance on an update of the region around a selected link, whereas the mobile terminal 10 does not give much consideration to updates of other regions. For example, when the user selects a link and moves to the linked page, the region around the selected link within the source page is regarded as a target region.

A fifth method of target region determination performed by the display region acquisition section 41 may be such that importance is placed on an update of a region around an anchored link coming in a jump, whereas not much consideration is given to updates of other regions. For example, when the link selected by the user is an anchored link, a region around the anchor in the linked page is regarded as a target region.

Figure 19:
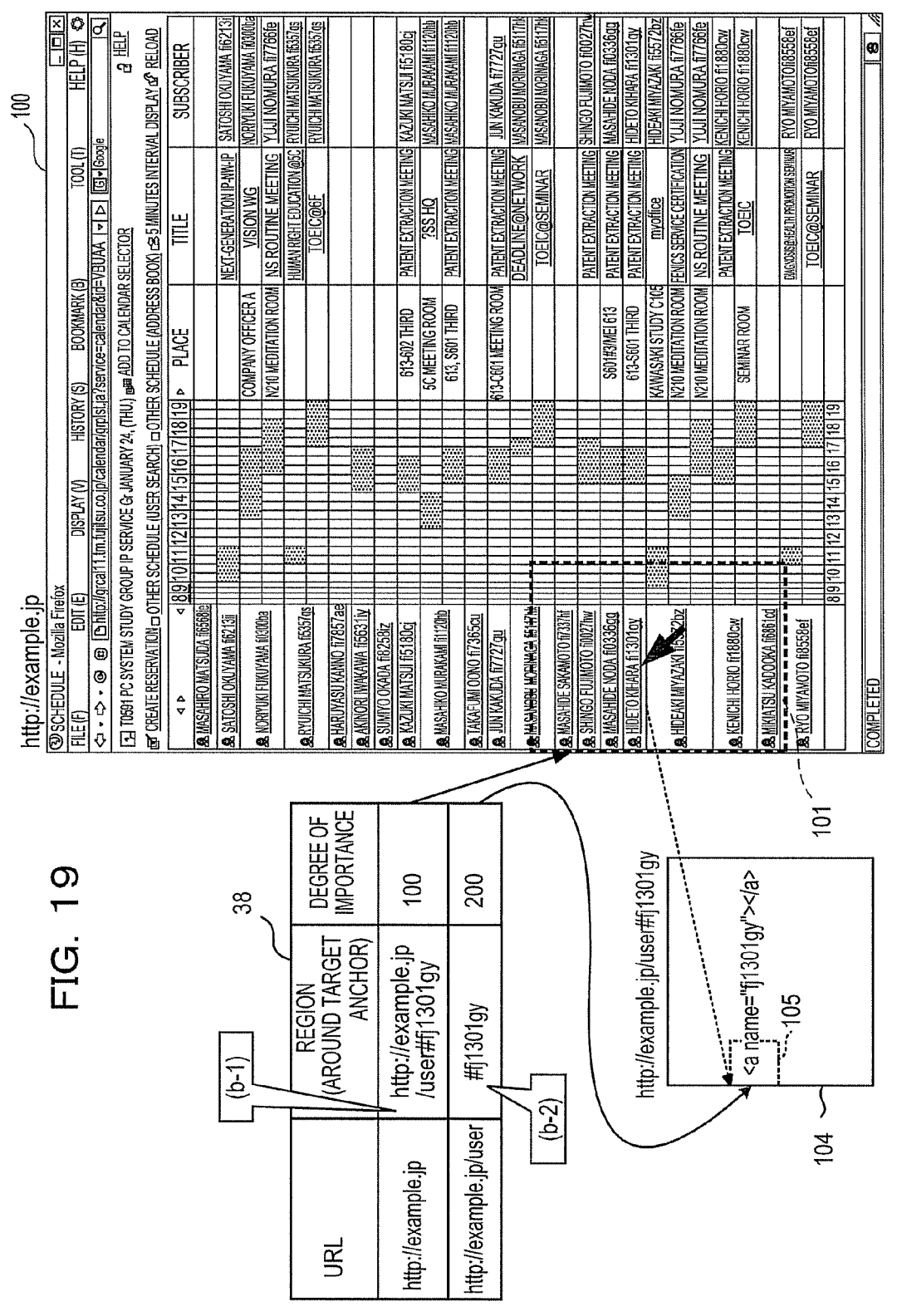

FIG. 19 is an image diagram of the fourth and fifth methods of target region determination carried out by the display region acquisition section 41. According to the fourth target region determination method, when, for example, the user selects a link on a page 100 and moves to a linked page 104, a region around the link selected in the linked page 100 (display region of a screen size 101 of the mobile terminal 10) is regarded as a target region.

Furthermore, according to the fifth method of target region determination, when, for example, a link selected by the user is an anchored link, a region 105 around the anchor in the linked page 104 is regarded as a target region. While specific methods (processes) are discussed herein, the present invention is not limited to exact processing of these methods and may include any variations including combination thereof.

As for the update frequency discrimination method carried out by the update frequency discrimination section 52, the update frequency (update interval) of the entire page is calculated through averaging from an update history of past pages. In a check to determine whether or not the entire page has been updated, updates of regions where the degree of importance of the regions in the page is less than a threshold are ignored.

Figure 20:
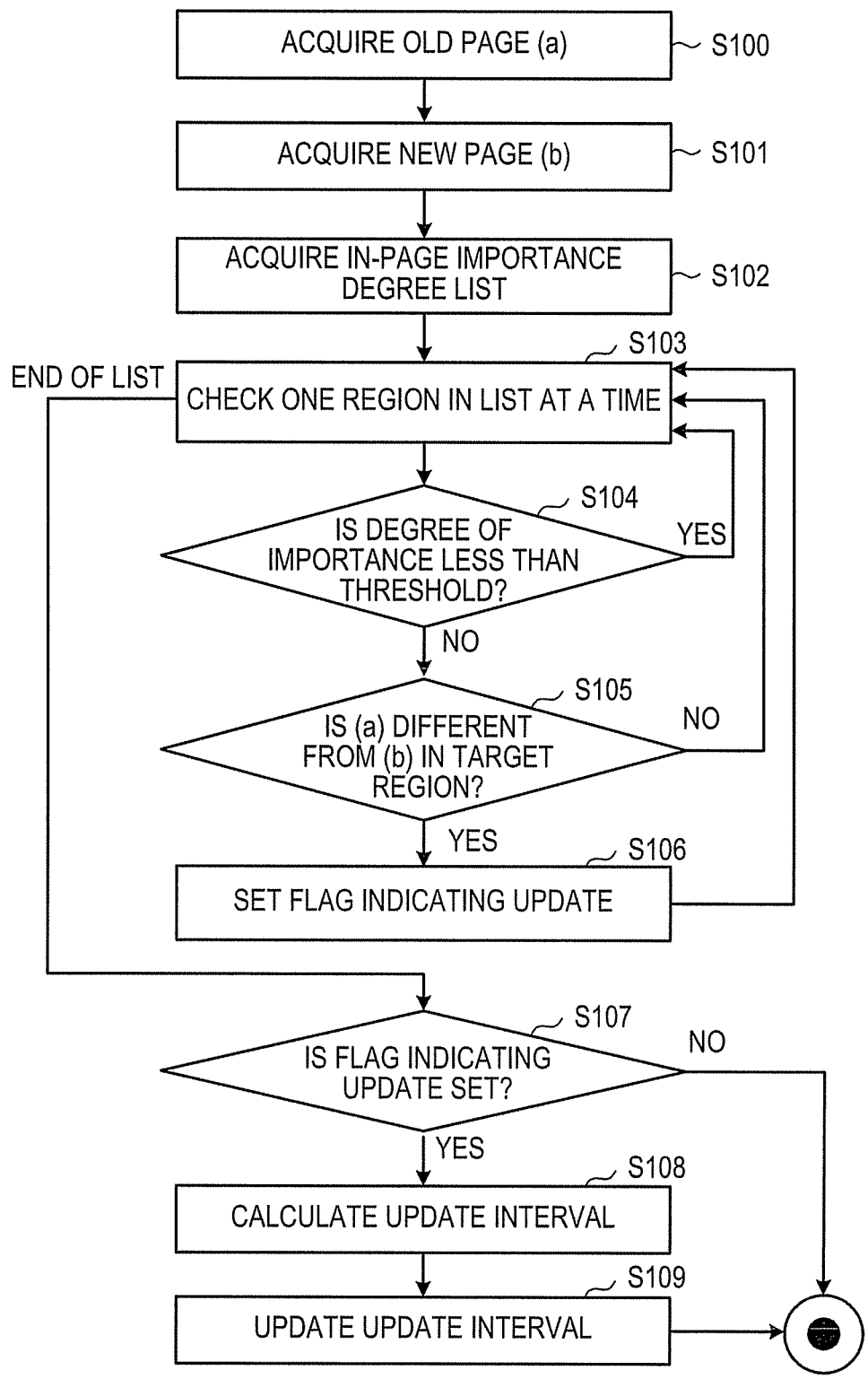
FIG. 20 is a flowchart illustrating a procedure for update frequency discrimination processing performed by an update frequency discrimination section.

FIG. 20 is a flowchart illustrating a procedure for update frequency discrimination processing carried out by the update frequency discrimination section 52. The update frequency discrimination section 52 acquires data (old HTML) from the off-line data DB 57 by specifying a terminal ID and URL (operation S100). The update frequency discrimination section 52 acquires data (new HTML) from the HTML cache 59 by specifying a URL (operation S101).

The update frequency discrimination section 52 acquires the in-page importance degree list from the in-page degree of importance DB 58 by specifying a terminal ID and URL (operation S102). To be more specific, the update frequency discrimination section 52 acquires the region and degree of importance (for example, accumulated display time) from the in-page degree of importance DB 58 by specifying a terminal ID and the URL.

The update frequency discrimination section 52 extracts one region and degree of importance at a time from the acquired in-page importance degree list (operation S103). The update frequency discrimination section 52 determines whether or not the extracted degree of importance is less than a threshold (operation S104).

When the extracted degree of importance is less than the threshold, the update frequency discrimination section 52 returns to operation S103 and extracts the next region and degree of importance from the in-page importance degree list.

On the other hand, when the extracted degree of importance is not less than the threshold, the update frequency discrimination section 52 determines whether or not there is any difference in the region (target region) extracted in operation S103 between the old HTML acquired in operation S100 and the new HTML acquired in operation S101 (operation S105).

When there is no difference in the region extracted in operation S103 between the old HTML acquired in operation S100 and the new HTML acquired in operation S101, the update frequency discrimination section 52 extracts the next region and degree of importance from the in-page importance degree list (operation S103).

When there is a difference in the region extracted in operation S103 between the old HTML acquired in operation S100 and the new HTML acquired in operation S101, the update frequency discrimination section 52 sets a flag indicating an update (operation S106) and then extracts the region and the degree of importance from the in-page importance degree list (operation S103). When all regions and degrees of importance have been extracted from the acquired in-page importance degree list, the update frequency discrimination section 52 moves to operation S107 and determines whether or not a flag indicating an update is set.

When no flag indicating an update is set, the update frequency discrimination section 52 finishes the update frequency discrimination processing illustrated in FIG. 20. When a flag indicating an update is set, the update frequency discrimination section 52 calculates an update interval m, for example, by dividing a total elapsed time T by an update count n (operation S108). The update frequency discrimination section 52 updates the update interval (update frequency) of the update frequency DB 61 by specifying a terminal ID and URL (operation S109).

After operation S109, the update frequency discrimination section 52 returns information as to whether the target region in the new HTML has been updated to the off-line data updating section 54. By returning the information that the target region in the new HTML has been updated to the off-line data updating section 54, the update frequency discrimination section 52 can cause the off-line data updating section 54 to update the old HTML stored in the off-line data DB 57 to a new HTML.

However, in operation S108 of FIG. 20, when there is a variation in the update frequency, for example, when the update frequency is high in the daytime and low in the nighttime or when the update frequency is high on weekdays and low on holidays or the like, simply taking the average may cause the update frequency to be calculated to be relatively lower than a value expected by the user.

Figure 21:
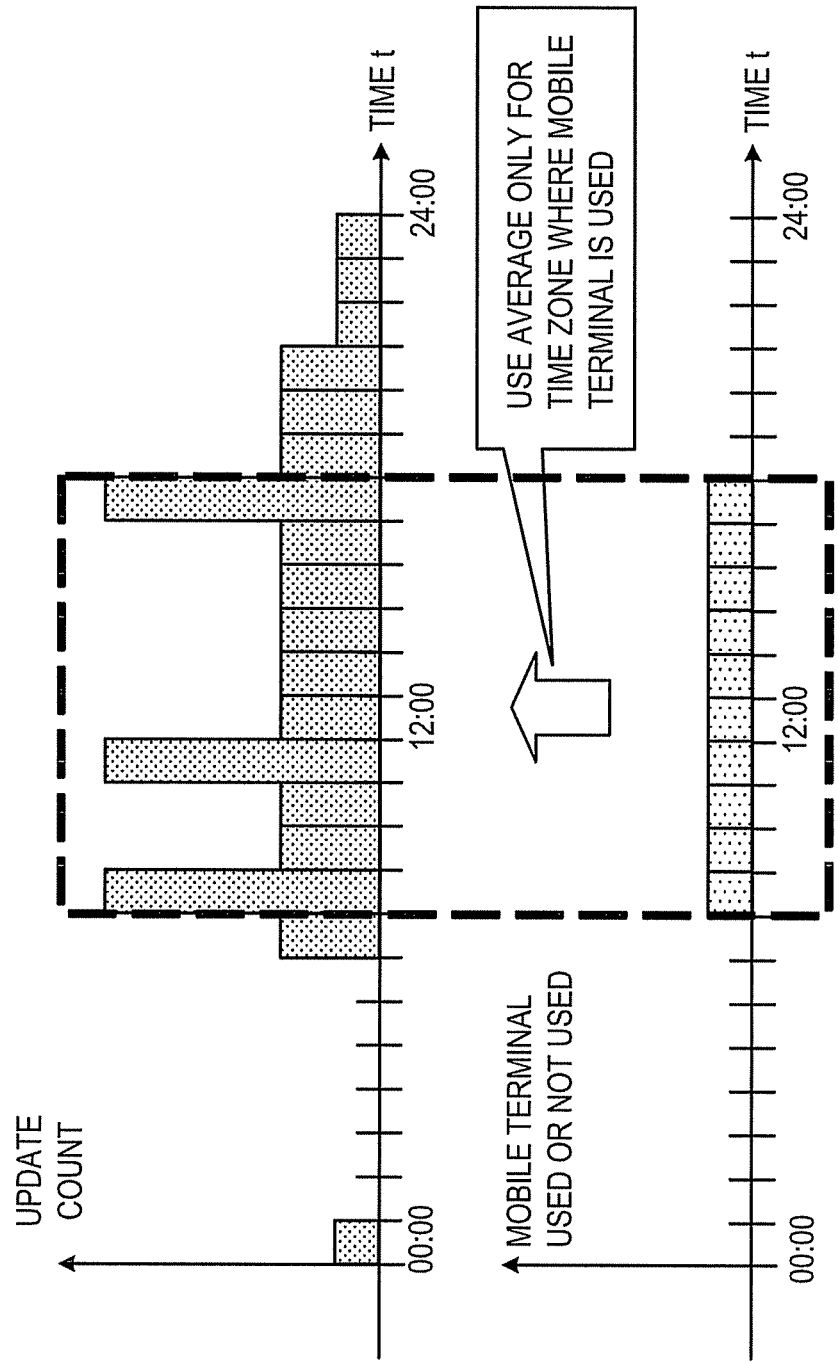
FIG. 21 illustrates an example of a method of averaging a time during which the user uses the mobile terminal.

Therefore, in operation S108 of FIG. 20, a method of taking the average of the time during which the user uses the mobile terminal 10 may be adopted as illustrated in FIG. 21. FIG. 21 is an image diagram illustrating an example of the method of taking the average of the time during which the user uses the mobile terminal 10.

Figure 22:
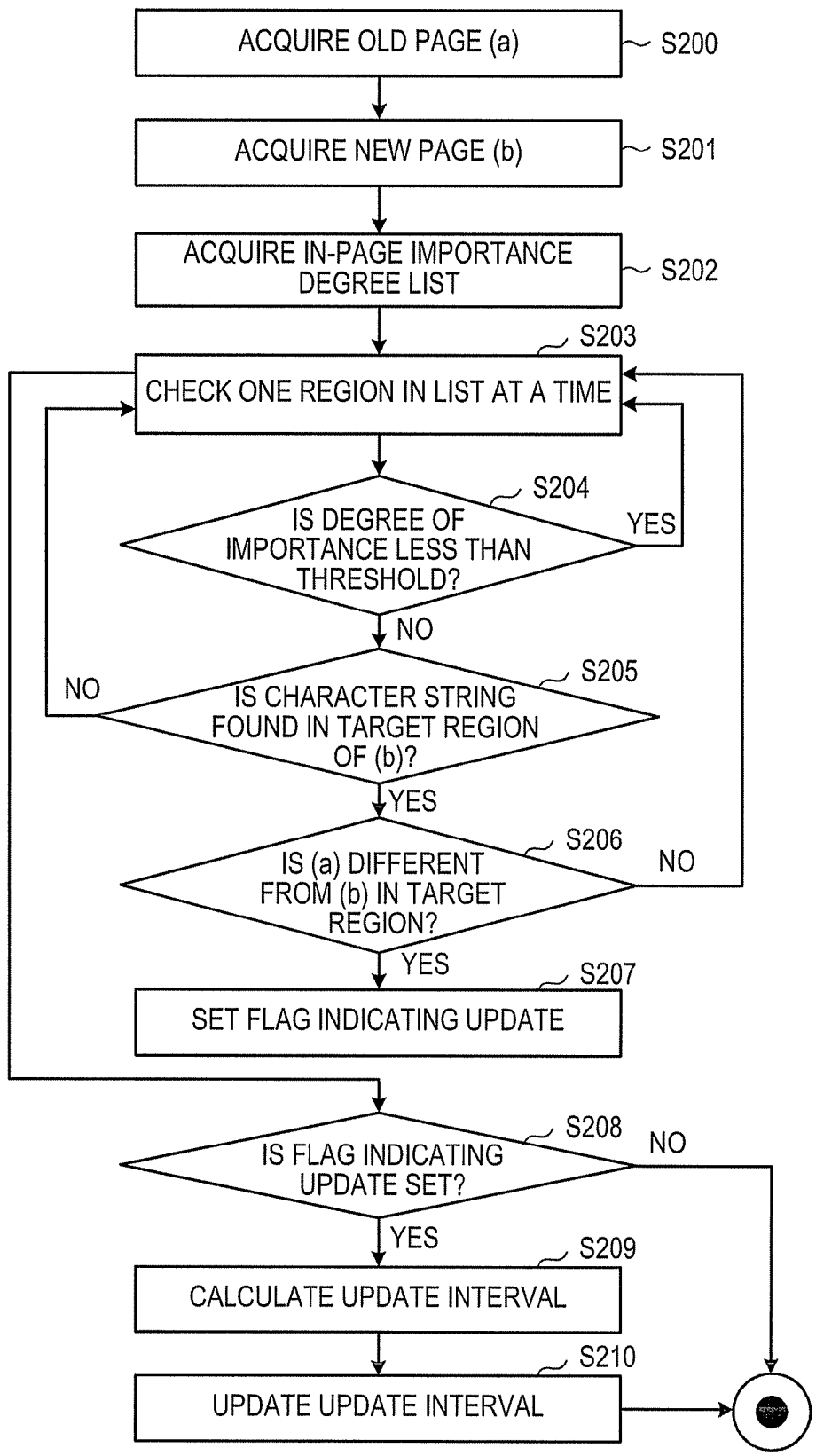
FIG. 22 is a flowchart illustrating another procedure for update frequency discrimination processing performed by the update frequency discrimination section.

The update frequency discrimination processing when the aforementioned third method of target region determination is used is as illustrated in FIG. 22. FIG. 22 is a flowchart illustrating another procedure for the update frequency discrimination processing carried out by the update frequency discrimination section 52. The update frequency discrimination processing when the third method of target region determination is used compares the display contents of the old HTML with the display contents of the new HTML in character strings. When no character strings of the old HTML are found in the new HTML, such character strings are ignored. That is, the update frequency discrimination processing when the third method of target region determination is used uses character strings that will not change even if the page is updated.

The processing in operations S200 to S204 is similar to the processing in operations S100 to S104 of FIG. 20 and explanations thereof will be omitted. When the extracted degree of importance is not less than a threshold in operation S204, the update frequency discrimination section 52 determines whether or not any character string is found within the target region of the new HTML (operation S205).

When no character string is found within the target region of the new HTML, the update frequency discrimination section 52 extracts the next region and degree of importance from the in-page importance degree list (operation S203). When a character string is found within the target region of the new HTML, the process moves to operation S206. The processing in operations S206 to S210 is similar to the processing in operations S105 to S109 of FIG. 20 and explanations thereof will be omitted.

As described so far, the information browsing system 1 of an embodiment automatically adjusts the update frequency per page based on the user operation on the mobile terminal 10. That is, the information browsing system 1 determines the target region in the page based on the user operation on the mobile terminal 10 side and determines the update frequency of the entire page with priority given to the update frequency of the target region. Furthermore, when the user explicitly performs a reloading operation on the mobile terminal 10 side, the information browsing system 1 increases the update frequency.

Therefore, the information browsing system 1 (FIG. 1) of an embodiment transfers an off-line content when a region of interest for the user is updated, and can thereby suppress unnecessary communication and reduce a communication charge and battery consumption. Furthermore, automatically adjusting the update frequency based on a normal browsing operation of the user eliminates the necessity for any special operation of the user to adjust the update frequency of an off-line content. Thus, eliminating the necessity for any special operation of the user to adjust the update frequency of the off-line content has a great effect for the mobile terminal having a limited input interface.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A relay server for relaying information delivered from an information delivery server as off-line data to mobile terminals, comprising:
   a memory; and
   a processor that executes a procedure in the memory, the procedure including:
      determining an update frequency of information for each of the mobile terminals based on display situation data of information received from a mobile terminal;
      determining whether to create off-line data to be transmitted for each of the mobile terminals based on the update frequency of the determined information and creating off-line data to be transmitted to the mobile terminal from the information delivered from the information delivery server when said determining indicates that the off-line data is to be created for the mobile terminal;
      transferring an update date and time of the information, the update frequency of the information and the created off-line data to the mobile terminal; and
      determining a degree of importance per region of the information based on display situation data per region of the information received from the mobile terminal, the degree of importance determined for each of the mobile terminals, and
   wherein the determining of the update frequency determines the update frequency of the information for each of the mobile terminal based on display situation data of the information received from the mobile terminal when an update is detected in a region where the degree of importance of the information delivered from the information delivery server is equal to or greater than a threshold based on the degree of importance per region of the information determined.

2. The relay server according to claim 1, wherein the determining of the degree of importance includes receiving a display time per region of the information as the display situation data per region of the information from the mobile terminal and determining the region of the information having a long display time has a high degree of importance.

3. The relay server according to claim 1, wherein the determining of the degree of importance includes receiving information of a link selected by a user with the mobile terminal as the display situation data per region of the information from the mobile terminal and determining a region around the link has a high degree of importance.

4. A mobile terminal that receives information delivered from an information delivery server via a relay server as off-line data, comprising:
   the mobile terminal including at least one storage unit:
      recording display situation data per region of off-line data displayed;
      storing off-line data previously received from the relay server;

the mobile terminal executing an operation including:
acquiring, upon receiving a request to display the off-line data stored, an update date and time, and update frequency of the off-line data and determines whether necessary to update the off-line data stored based on the update date and time, and update frequency;
acquiring, when determining that the off-line data stored needs to be updated, display situation data recorded and transmitting the display situation data to the relay server;
receiving the off-line data created by the relay server based on the display situation data, update date and time, and update frequency of the off-line data from the relay server and updating off-line data previously received from the relay server and stored in the off-line data to off-line data newly received from the relay server;
displaying off-line data previously received from the relay server and stored when determining that the off-line data stored need not be updated and displaying off-line data newly received from the relay server and stored when determining that the off-line data stored needs to be updated, and
determining a degree of importance per region of information based on display situation data per region of information received from the mobile terminal, the degree of importance determined for each of mobile terminals, and
wherein update frequency of the information for each of the mobile terminal is determined based on display situation data of the information received from the mobile terminal when an update is detected in a region where the degree of importance of the information delivered from the information delivery server is equal to or greater than a threshold based on the degree of importance per region of the information determined.

5. An information browsing system including an information delivery server that delivers information, a mobile terminal that displays off-line data and a relay server that relays the information delivered from the information delivery server as off-line data to the mobile terminal connected to each other in a data communicable manner, comprising:
an update frequency discriminating unit to determine an update frequency of the information for each of the mobile terminals based on display situation data of the information received from the mobile terminal;
an off-line data creating unit to determine whether to create off-line data to be transmitted to the mobile terminal for each of the mobile terminals based on an update frequency of the determined information and creating off-line data to be transmitted to the mobile terminal from the information delivered from the information delivery server when said determining indicates that the off-line data is to be created; and
an off-line data transferring unit to transfer an update date and time of the information and update frequency of the information as well as the created off-line data to the mobile terminal, and
the mobile terminal configured to execute an operation including:
recording display situation data per region of the off-line data displayed;
storing off-line data previously received from the relay server;
acquiring, upon receiving a request to display the off-line data stored, an update date and time, and update frequency of the off-line data and determining whether necessary to update the off-line data stored based on the update date and time, and update frequency;
acquiring, when determining that the off-line data stored needs to be updated, display situation data recorded and transmitting the display situation data to the relay server;
receiving the off-line data created by the relay server based on the display situation data, update date and time, and update frequency of the off-line data from the relay server and updating off-line data previously received from the relay server and stored in the off-line data to off-line data newly received from the relay server;
displaying off-line data previously received from the relay server and stored when determining that the off-line data stored need not be updated and displaying off-line data newly received from the relay server and stored when determining that the off-line data stored needs to be updated, and
determining a degree of importance per region of the information based on display situation data per region of the information received from the mobile terminal, the degree of importance determined for each of the mobile terminals, and
wherein the update frequency of the information for each of the mobile terminal is determined based on display situation data of the information received from the mobile terminal when an update is detected in a region where the degree of importance of the information delivered from the information delivery server is equal to or greater than a threshold based on the degree of importance per region of the information determined.

6. A non-transitory computer-readable storage medium storing a program for controlling a relay server that relays information delivered from an information delivery server as off-line data to mobile terminals, the program causing the computer to execute an operation comprising:
determining an update frequency of the information for each of the mobile terminals based on display situation data of the information received from the mobile terminal;
determining whether to create off-line data to be transmitted to the mobile terminal based on the update frequency of the determined information for each of the mobile terminals and creating off-line data to be transmitted to the mobile terminal from the information delivered from the information delivery server when said determining indicates that the off-line data is to be created;
transferring an update date and time of the information, and update frequency of the information as well as the created off-line data to the mobile terminal; and
determining a degree of importance per region of the information based on display situation data per region of the information received from the mobile terminal, the degree of importance determined for each of the mobile terminals, and
wherein the determining of the update frequency determines the update frequency of the information for each of the mobile terminal based on display situation data of the information received from the mobile terminal when an update is detected in a region where the degree of importance of the information delivered from the information delivery server is equal to or greater than a threshold based on the degree of importance per region of the information determined.

7. A non-transitory computer-readable storage medium storing a program for controlling mobile terminals that receive information delivered from an information delivery server as off-line data via a relay server, the program causing the computer to execute an operation, comprising:
- recording display situation data per region of the off-line data displayed;
- storing off-line data previously received from the relay server;
- acquiring, upon receiving a request to display the off-line data stored, an update date and time, and update frequency of the off-line data and determining whether necessary to update the off-line data stored based on the update date and time, and update frequency;
- acquiring, when determining that the off-line data stored needs to be updated, display situation data recorded and transmitting the display situation data to the relay server;
- receiving the off-line data created by the relay server based on the display situation data, update date and time, and update frequency of the off-line data from the relay server and updating off-line data previously received from the relay server and stored in the off-line data to off-line data newly received from the relay server;
- displaying off-line data previously received from the relay server and stored when determining that the off-line data stored need not be updated and displaying off-line data newly received from the relay server and stored when determining that the off-line data stored needs to be updated; and
- determining a degree of importance per region of the information based on display situation data per region of the information received from the mobile terminal, the degree of importance determined for each of the mobile terminals, and
- wherein update frequency of the information for each of the mobile terminal is determined based on display situation data of the information received from the mobile terminal when an update is detected in a region where the degree of importance of the information delivered from the information delivery server is equal to or greater than a threshold based on the degree of importance per region of the information determined.

8. A computer implemented method, comprising:
- periodically requesting an off-line data update processing based on automatic determination of a degree of importance per region of data in accordance with display situation information received from a mobile terminal, said periodically requesting being based on an update frequency stored in the mobile terminal;
- determining the update frequency for the mobile terminal based on the display situation information when an update is detected in a region where the degree of importance of information delivered from a delivery server is equal to or greater than a threshold based on the degree of importance per region of the data; and
- updating, the mobile terminal, with off-line data by creating the off-line data to be transmitted to the mobile terminal from the information delivered from the delivery server when the determining of the update frequency indicates the off-line data is to be created;
- transferring an update date and time of the information, the update frequency of the information and the created off-line data to the mobile terminal.

* * * * *

UNITED STATES PATENT AND TRADEMARK OFFICE
CERTIFICATE OF CORRECTION

PATENT NO. : 8,732,235 B2
APPLICATION NO. : 12/614646
DATED : May 20, 2014
INVENTOR(S) : Kihara et al.

It is certified that error appears in the above-identified patent and that said Letters Patent is hereby corrected as shown below:

In the Claims

Column 20, Line 24, in Claim 8, after "data;" delete "and".
Column 20, Line 29, in Claim 8, after "created;" insert -- and --.

Signed and Sealed this
Nineteenth Day of August, 2014

Michelle K. Lee
*Deputy Director of the United States Patent and Trademark Office*